US012203575B2

(12) United States Patent
Petrou

(10) Patent No.: US 12,203,575 B2
(45) Date of Patent: Jan. 21, 2025

(54) ROTARY UNION HAVING PRESSURE SLEEVE

(71) Applicant: Deublin Company, LLC, Waukegan, IL (US)

(72) Inventor: Anton A. Petrou, Hawthorn Woods, IL (US)

(73) Assignee: Deublin Company, LLC, Waukegan, IL (US)

( * ) Notice: Subject to any disclaimer, the term of this patent is extended or adjusted under 35 U.S.C. 154(b) by 0 days.

(21) Appl. No.: 18/095,224

(22) Filed: Jan. 10, 2023

(65) Prior Publication Data

US 2023/0235839 A1    Jul. 27, 2023

Related U.S. Application Data

(60) Provisional application No. 63/303,434, filed on Jan. 26, 2022.

(51) Int. Cl.
*F16L 27/08* (2006.01)
*F16J 15/34* (2006.01)

(52) U.S. Cl.
CPC ............. *F16L 27/082* (2013.01); *F16J 15/34* (2013.01)

(58) Field of Classification Search
CPC ..... F16L 27/082; F16L 39/06; F16L 27/0812; F16L 27/0816; F16J 15/34
See application file for complete search history.

(56) References Cited

U.S. PATENT DOCUMENTS

| 4,928,978 | A | * | 5/1990 | Shaffer | F16J 15/34 277/401 |
|---|---|---|---|---|---|
| 5,199,748 | A | | 4/1993 | Jung et al. | |
| 7,815,224 | B2 | | 10/2010 | Ford et al. | |
| 9,970,577 | B2 | | 5/2018 | Conroy et al. | |
| 11,274,782 | B2 | | 3/2022 | Petrou et al. | |
| 2012/0280456 | A1 | * | 11/2012 | Young | F16J 15/3408 277/400 |
| 2014/0175747 | A1 | * | 6/2014 | Portenlanger | F16J 15/34 277/306 |
| 2015/0130141 | A1 | * | 5/2015 | Broadbent | F16J 15/34 277/361 |

(Continued)

FOREIGN PATENT DOCUMENTS

| JP | 11063335 A | * | 3/1999 | ............ F16L 27/082 |
| WO | WO 2012/163556 A1 | | 12/2012 | |

OTHER PUBLICATIONS

International Patent Application No. PCT/US2023/010596, Search Report (May 3, 2023).

*Primary Examiner* — David Bochna
(74) *Attorney, Agent, or Firm* — Husch Blackwell LLP

(57) ABSTRACT

A rotary union includes a non-rotating component forming a bore, and a non-rotating seal carrier slidably disposed in the bore. A pressure sleeve is slidably disposed in the bore between the non-rotating component and the non-rotating seal carrier. A non-rotating seal member is disposed on the non-rotating seal carrier, and a rotating seal carrier has a rotating seal member disposed thereon. Wherein the rotating seal member is disposed in opposed relation to the non-rotating seal member such that a sliding mechanical face seal is formed between the non-rotating and rotating seal members when the non-rotating seal carrier slides towards the rotating seal carrier in the presence of fluid pressure.

14 Claims, 4 Drawing Sheets

(56) References Cited

U.S. PATENT DOCUMENTS

| | | | |
|---|---|---|---|
| 2015/0211638 A1* | 7/2015 | Itadani | F16J 15/34 |
| | | | 277/367 |
| 2015/0226333 A1* | 8/2015 | Yanagisawa | F16J 15/34 |
| | | | 277/358 |
| 2018/0195618 A1* | 7/2018 | Itadani | F16J 15/34 |
| 2021/0095766 A1* | 4/2021 | Nilsson | F16J 15/34 |
| 2022/0170511 A1* | 6/2022 | Oka | F16J 15/34 |

* cited by examiner

ROTARY UNION HAVING PRESSURE SLEEVE

CROSS-REFERENCE TO RELATED APPLICATIONS

This patent application claims the benefit of U.S. Provisional Patent Application No. 63/303,434, filed Jan. 26, 2022, which is incorporated by reference.

FIELD OF THE DISCLOSURE

The present disclosure relates to rotary unions and, more specifically, to rotary unions having multiple passages.

BACKGROUND OF THE DISCLOSURE

Rotary unions having multiple passages are known for creating sealed or sealable fluid passages between rotating and non-rotating machine components. Due to their typical complexity, multiple passage rotary unions are often prone to leakage due to wear or, in some instances, incomplete or incorrect assembly of the device. Moreover, the complex assembly or disassembly process associated with servicing such unions presents a time consuming and costly undertaking.

A typical rotary union includes a non-rotating seal carrier having a seal between a media channel of the union and a housing or bore in which the non-rotating seal carrier is slidably and sealably disposed. One example of a rotary union can be seen in U.S. Pat. No. 7,815,224 to Ford et. al. (hereinafter, "Ford"). As described in Ford, a rotary union typically has a balance ratio, which is defined as the ratio between the average load imposed by a sealed, internal pressure on a seal face between the rotating seal and a non-rotating seal, which can be expressed algebraically as $B=P_f/P$, where $P_f$ is the sealed pressure on the seal face of the primary seal assembly, i.e., the sealed pressure acting along an interface between the rotating and non-rotating seal members, and P is the sealed pressure present within a media channel of the union.

In the device of Ford, it can be seen that the seal used to slidably seal the non-rotating seal carrier as it moves between seal-engaged and seal-disengaged positions is shown as a U-cup seal, which is effective in providing effective sealing when pressure is applied in the concave face of the seal. However, such seals are not effective when pressures are applied on both sides of the seal, that is, when rotary unions are operating in conditions of internal pressurization as well as external pressurization.

BRIEF SUMMARY OF THE DISCLOSURE

The present disclosure relates to a rotary union that is used as a standalone device or as part of a multi-passage rotary union such as the union described in co-pending U.S. patent application Ser. No. 16/152,749, filed on Oct. 5, 2019, which is incorporated in its entirety herein by this reference. In a rotary union in accordance with the disclosure, a housing forms a generally straight bore that permits the modular assembly of the union, which is an improvement over known rotary union configurations. The rotary union components include one or more sliding seal carriers, which are arranged not to rotate relative to the housing and which include an intermediate collar disposed between at least one non-rotating seal carrier and the housing. A pair of seals are disposed on either side of the intermediate collar. The collar, and the seals, participate in defining opening and closing hydraulic or pneumatic surfaces that correspondingly open and close a mechanical face seal created between a non-rotating seal member or seal ring disposed on the non-rotating seal carrier and a corresponding rotatable seal carrier or seal ring disposed on a rotatable seal carrier. The intermediate ring moves axially between the pair of seals to impart at least an additional closing force tending to push the seal rings together under certain circumstances. The rotary union in accordance with the disclosure is advantageously configured or arranged to operate under internal or external application of fluid pressure.

In one aspect, the present disclosure describes a rotary union. The rotary union includes a non-rotating component forming a bore, and a non-rotating seal carrier slidably disposed in the bore. A pressure sleeve is slidably disposed in the bore between the non-rotating component and the non-rotating seal carrier. A non-rotating seal member is disposed on the non-rotating seal carrier, and a rotating seal carrier has a rotating seal member disposed thereon. Wherein the rotating seal member is disposed in opposed relation to the non-rotating seal member such that a sliding mechanical face seal is formed between the non-rotating and rotating seal members when the non-rotating seal carrier slides towards the rotating seal carrier in the presence of fluid pressure.

In another aspect, the present disclosure describes a multi-media rotary union. The multi-media rotary union includes a housing having a cylindrical bore extending through a body of the housing, the cylindrical bore being substantially straight, and a shaft rotatably supported within the cylindrical bore of the housing. A carriage forms a bore and radial passages, the carriage being disposed in sealed relation within the cylindrical bore of the housing. A non-rotating seal carrier is slidably disposed in the bore. A pressure sleeve is slidably disposed in the bore between the carriage and the non-rotating seal carrier. A non-rotating seal member is disposed on the non-rotating seal carrier, and a rotating seal carrier having a rotating seal member is disposed on the non-rotating seal carrier, which forms additional radial passages. The non-rotating seal carrier is engaged to rotate with the shaft. Wherein the rotating seal member is disposed in opposed relation to the non-rotating seal member such that a sliding mechanical face seal is formed between the non-rotating and rotating seal members when the non-rotating seal carrier slides towards the rotating seal carrier in the presence of fluid pressure to provide a sealed fluid passage extending between the radial passages and the additional radial passages.

Figure 3:
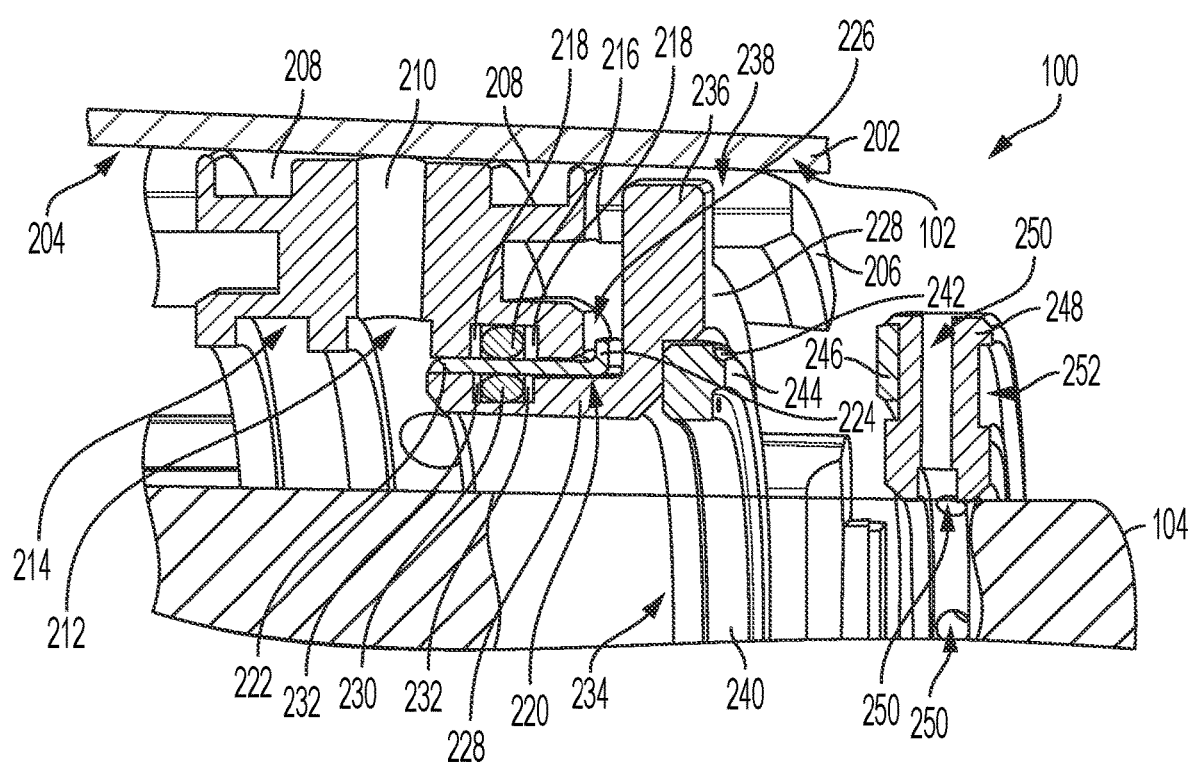
FIG. 3 is a cross section of the multiple-passage rotary union shown in FIGS. 1 and 2.
Figure 4:
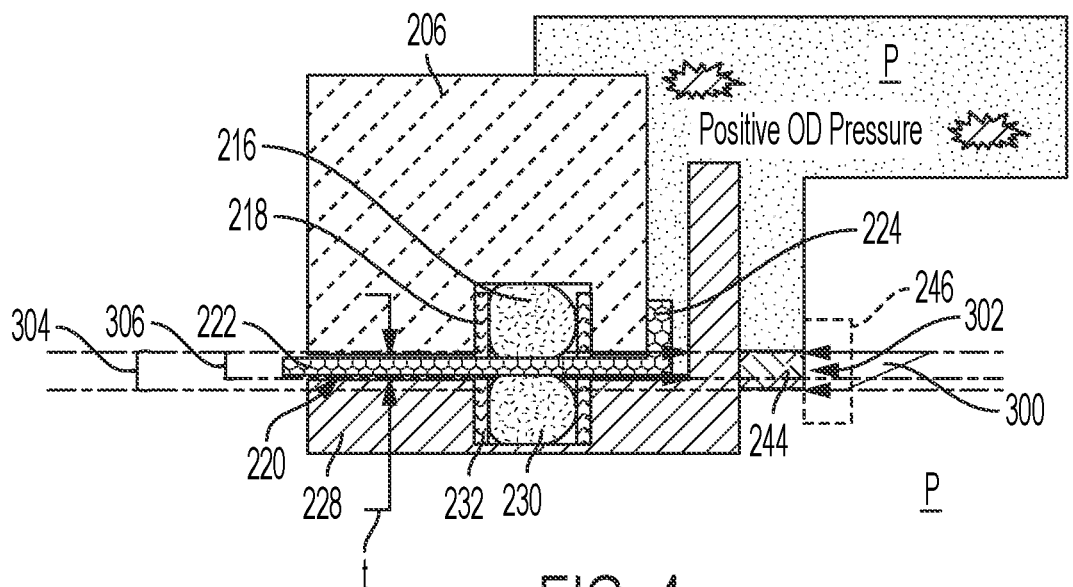
Figure 5:
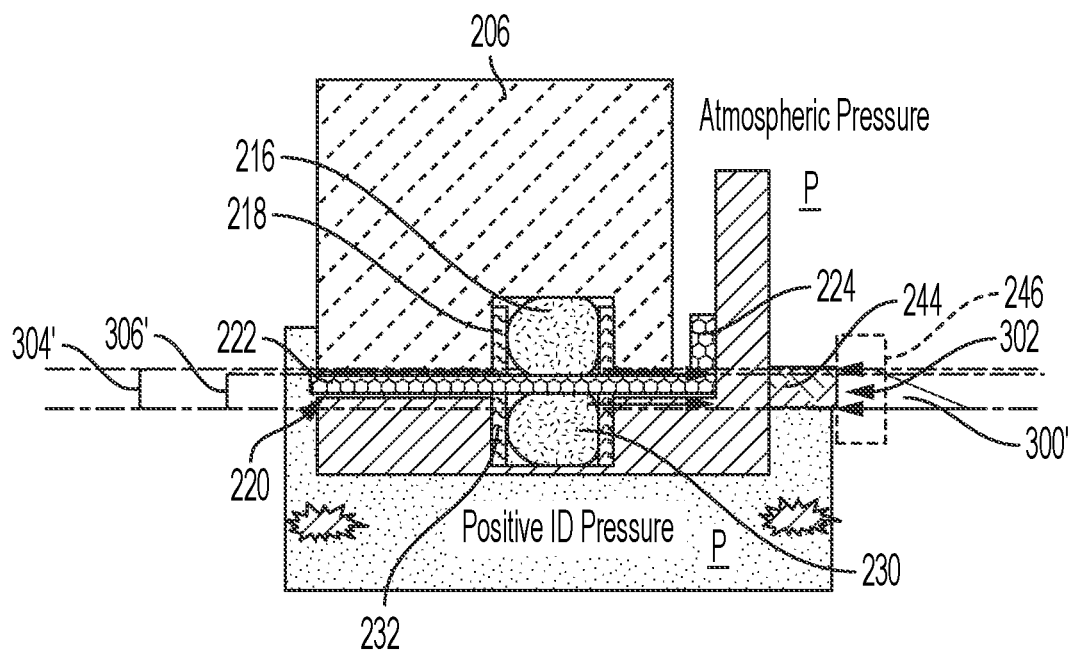

Each of FIGS. 4 and 5 is an enlarged detail of the cross section of FIG. 3.

DETAILED DESCRIPTION OF THE DRAWINGS

In the exemplary embodiment described herein, a multi-channel rotary union includes a housing having a cylindrical bore extending through a body of the housing, the cylindrical bore being substantially straight. The rotary union further includes a shaft rotatably mounted in the cylindrical bore, the shaft having a longitudinal axis extending along a centerline of the bore. A plurality of annular plates is mounted on the shaft, the plurality of annular plates being spaced apart from one another at regular intervals along the longitudinal axis, each of the plurality of annular plates extending a radial distance from the shaft within the bore and having a radial passage extending therethrough, the plurality of annular plates being rotatably and sealably engaged to rotate with the shaft. A plurality of spools is disposed in alternating fashion between the plurality of annular plates. The plurality of spools sealably engages the cylindrical bore and is axially constrained with the housing so as not to rotate with the shaft. Each of the plurality of spools is disposed between two adjacent annular plates from the plurality of annular plates, and includes a corresponding sliding seal carrier that moves axially along the centerline of the bore in one direction or the other to engage and disengage the corresponding mechanical seal face between a seal ring carried by the sliding seal carrier and one side of an adjacent annular plate that faces the seal carrier.

Figure 1:
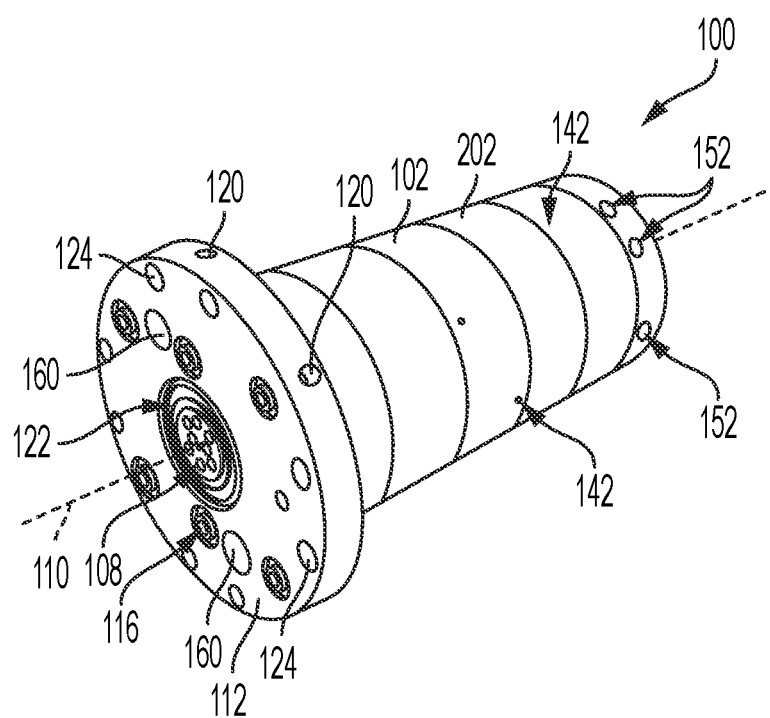
FIG. 1 is an outline view from a front perspective of a multiple-passage rotary union in accordance with the disclosure.
Figure 2:
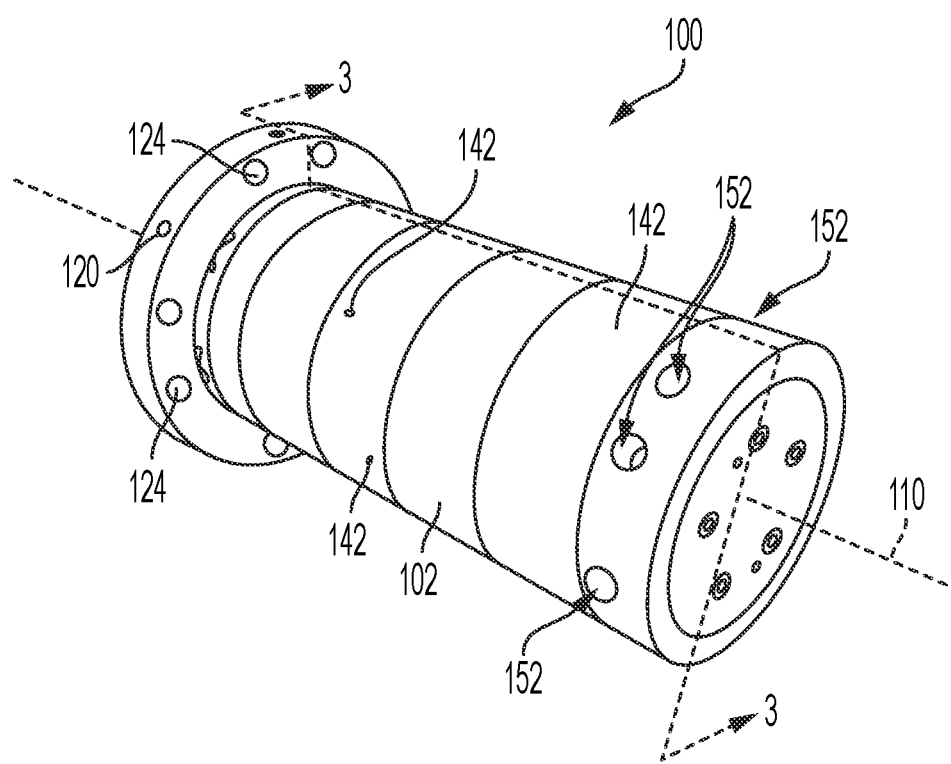
FIG. 2 is an outline view from a rear perspective of a multiple-passage rotary union in accordance with the disclosure.

Outline views from the front and rear perspectives of a rotary union 100 are shown in FIGS. 1 and 2, respectively. An enlarged section view of a portion of the interior of the union 100 is shown in FIG. 3. The rotary union 100 in the illustrated embodiment includes eight fluid passages, but it should be appreciated that its modular construction is suited for rotary unions having fewer or more than eight passages, including a union having a single fluid passage. It should be appreciated that in the multi-passage union 100 shown here, each fluid passage (if there are multiple fluid passages) extending through the union will have a corresponding mechanical face seal arrangement as described in the paragraphs that follow.

As shown in the exemplary embodiment shown in the figures, the rotary union 100 includes a housing 102 that surrounds a rotor shaft 104, which rotor shaft 104 can be seen in the cross section of FIG. 3 partially and in cross section so as not to obscure the remaining structures illustrated. In general terms, the rotor shaft 104 and any associated structures coupled to the shaft are arranged to rotate relative to the housing 102 and the structures that are associated with or generally coupled to the housing. Fluid passages extending through the rotor shaft 104 and housing 102 are connected to respective rotating and non-rotating machine parts such that the union 100 can provide sealed or sealable fluid passage(s) therethrough for fluids. In the known fashion, sealing arrangements operating within the union 100 provide the sealable connections to the portions of the fluid passages that are either rotating or not. In the embodiment shown, the rotor shaft 104 is connected to a flange 108 (FIG. 1) at one end, which provides fluid interfaces for the various fluid passages extending through the rotary union 100. The housing 102 also provides fluid interfaces or fluid ports 120, 152 or 160. Fluid interfaces on the shaft are connectable to fluid interfaces on the housing to communicate fluid connections therebetween during operation. The formation of the seal between rotating and non-rotating portions of the fluid passages internally to the union is arranged to be automatically effected when fluid under pressure is introduced either in the rotating or non-rotating portions of the passages. These fluid passages, as will be described hereinafter in additional detail, extend through the union and are fluidly isolated from one another, and from the environment, by use of sliding, mechanical face seals formed along sliding interfaces of components attached between the rotatable rotor shaft 104 and the housing 102.

In the embodiment shown, the flange 108 includes one or more rotating fluid ports that are arranged around a rotation axis 110 on a rear face 112 of the flange 108. The arrangement can be symmetrical or asymmetrical. The shape of the flange 108 is shown as a flat plate having a circular shape that is configured for connection to a rotating machine component (not shown). The flange 108 provides the flexibility or opportunity to include various other passages and fluid ports disposed at locations that facilitate the connection of the union 100 to a variety of machines. For example, each of the rotating fluid ports on the flange 108 can be connected internally to the housing with an axially-extending port 116 disposed radially outwardly relative to the rotating fluid ports and/or to radially facing fluid ports 120 disposed along an outer periphery of a flange 108. These and other arrangements permit the flexible and convenient connection of fluid passages of the rotating machine component to the union 100.

Sealing grooves 122 that accommodate, for example, radial seals (not shown) or any other type of seal or gasket can also be incorporated in the flat surface of the flange 108 at the rear of the union 100, as well as mounting holes 124 for mounting the flange and, thus, the union 100, to the rotating machine component (not shown). The housing 102 is made of segments 142 that are stacked into a hollow cylinder. The rotating ports in the flange 108 are fluidly connectable to corresponding non-rotating fluid ports 152 formed in the housing 102.

In reference now specifically to FIG. 3, it can be seen that the shaft 104 extends through the housing 102, a portion of which is shown. The housing 102 may include a generally hollow cylindrical outer shell or housing 202 that forms a bore 204 internally into which components are mounted. As shown, included within the shell 202 is a carriage 206 that is non-rotatably engaged with the shell 202. The carriage 206 includes peripherally extending channels 208 and one or more radially extending channel(s) 210. The one or more radially extending channel(s) 210 fluidly connects an interior, annularly extending media channel 212 of the carriage 206 with an interior of the bore 204 such that fluid can be transferred, for example, through the ports 152, 120 or 160 in the housing 102. Seals, for example radial seals (not shown), can be placed within the peripherally extending channels 208 to seal the fluid present in the media channel 212 from fluid that may be present in adjacent channels in the same or an adjacent carriage 206. When the union 100 is fully assembled, more than one fluid paths therethrough can be created by assembling carriages 206 in stacked order.

Each carriage includes one or more seal channels 214 along its inner portion. As shown, a first seal channel 214 (not marked) accommodates therein a seal 216. A second seal channel 214 is configured to accommodate a second seal 216 therein for a second rotary union arrangement (not shown) accommodated in the same carriage 206. The seal channels 214 are disposed on opposite sides of the media channel 212. Each seal channel 214 includes a radial seal 216 flanked on either side in an axial direction by an annular seal retainer 218. The seal retainers 218 ensure proper compression of the seal 216, which in the illustrated embodiment is an O-ring, and reduce deformation of the seal 216 under motion or pressure application conditions during operation of the union 100.

The outer radial seal 216 is disposed to seal against a pressure sleeve 220, which in the illustrated embodiment has a generally hollow cylindrical shape that includes a cylindrical portion 222 and a flange portion or shoulder 224. The shoulder 224 acts as a mechanical stop, in one direction, against an inner stop surface 226 formed on a portion of the carriage 206. The cylindrical portion has a thickness, t (see FIG. 4), in the radial direction perpendicular to the centerline 110. The pressure sleeve 220 is slidably disposed within a bore formed by the cartridge 206, and is also sealably disposed as it slides via contact of an outer peripheral and cylindrical surface of the cylindrical portion 222 with the outer radial seal 216.

A non-rotating seal carrier 228 is slidably and sealably disposed within an inner peripheral and cylindrical surface of the cylindrical portion 222. The non-rotating seal carrier 228 includes a peripherally extending channel that accommodates an inner non-rotating radial seal 230 flanged by two annular seal retainers 232. As with the outer non-rotating radial seal 216, the inner non-rotating radial seal 230 is prevented from excessive deformation due to sliding motion or pressure application by the retainers 232. The non-rotating seal carrier 228 includes an internal bore 234 that forms a portion of, and is fluidly open to, the media channel 212. The non-rotating seal carrier 228 further includes one or more radially extending keys 236 that are disposed within pockets 238 formed in the carriage 206 to prevent rotation of the non-rotating seal carrier 228 relative to the carriage 206 and, by extension, to the outer shell 202 and to the housing 102 overall.

The non-rotating seal carrier 228 further supports a non-rotating seal member 240, which includes a seal body portion 242 having a generally rectangular shape in cross section and which forms a raised portion 244 extending peripherally around an outer surface of the seal member 240. In this context, the outer surface of the seal member is a surface of the body portion that faces outwardly and away from the seal carrier 228 in the direction of axial motion of the carrier 228 within the carriage 206. In the embodiment shown, the non-rotating seal member 240 is configured to abut a rotating seal member 246, which is disposed on a rotating seal carrier 248, when the non-rotating seal carrier 228 is in an extended position (towards the right in the orientation shown in FIG. 3).

Abutting contact between the rotating and non-rotating seal members 246 and 240 creates a sliding mechanical face seal between the raised portion 244 and the exposed face of the rotating seal member 246 to seal fluids present either internally and/or externally to the mechanical face seal. Similar to the carriage 206, the non-rotating seal carrier 248 includes radially extending passages 250 and can be arranged to support more than one rotating seal member 246 on opposing faces, as shown, within two axially opposed seal ring channels 252. The rotating seal carrier 248 is engaged onto the shaft 104 and arranged to rotate therewith. Fluid passages formed in the shaft (not shown) are fluidly connected to the passages 250 for transmitting fluids therethrough and between sealed chambers created within the housing 202 and engaged mechanical face seals formed between non-rotating and rotating seal members 240 and 246 in the presence of pressurized media during operation.

Schematic views of the rotating and non-rotating seal members in two operating conditions and positions are shown in FIGS. 4 and 5, where structures and features that are the same or similar to corresponding structures and features previously described are denoted by the same reference numerals for sake of simplicity and discussion. In the operating condition shown in FIG. 4, pressurized fluid or media is provided externally to the mechanical face seal, i.e., within the housing 202 (FIG. 2) but externally to the media channel 212. In this operating condition, opening and closing hydraulic or pneumatic surfaces (depending on the nature of the fluid being a liquid or a gas) act on surfaces of the non-rotating seal carrier 228, the carriage 206, and the pressure sleeve 220. More specifically, a pressure distribution 300 acts in an opening direction (left as shown in FIG. 4) along an annular surface that exists along an interface 302 of sliding contact between the non-rotating seal member 244 and the rotating seal member 246 (shown in FIG. 3 and in broken line outline in FIG. 4 for illustration). As shown in FIG. 4, the pressure at a radially outward edge of the distribution 300 is at a maximum and equals the pressure of fluid, P, applied externally. The pressure then decreases along the interface 302 from the maximum value P to an internal pressure value, p, which may be atmospheric pressure or another pressure that is lower than P (p<P). The shape of the distribution 300 is shown as linear, which applies to liquids, but may take on another shape, for example, logarithmic or polynomial, for other types of fluids such as gasses or even liquids having high viscosity.

A net opening hydraulic surface area 304 can be defined as the total surface area of pressure-imbalanced surfaces of all structures present that have a net pressure applied thereon acting to push the non-rotating seal carrier 228 in an opening direction (towards the left in FIG. 4). Similarly, a net closing hydraulic surface area 306 can be defined as the total surface area of pressure-imbalanced surfaces of all structures present that have a net pressure applied thereon acting to push the non-rotating seal carrier 228 in a closing direction (towards the right in FIG. 4).

As can be seen in FIG. 4, the net closing area 306 is smaller than the net opening area 304, but the pressure acting on it is larger (i.e. there is profile to the pressure distribution with the pressure P acting on the entire closing area) which means that in the presence of the external pressure P, which is larger than the internal pressure p, if any, is larger, results in the a net force in the closing direction on the non-rotating seal carrier 228 and pressure sleeve 220 tending to push them in the closing direction (left, in the orientation of FIG. 4), which in turn results in engagement of the non-rotating and rotating seal members 244 and 246 to form the mechanical face seal 302.

As shown, the net closing area 306 is about 75% of the net opening area 304, which leaves about 25% of the opening area 304 to urge the combined non-rotating seal carrier 228 and pressure sleeve 220 in the closing direction until the sealing members abut and the mechanical face seal 302 is formed. In the arrangement of structures shown in FIG. 4, it can be seen that the net closing area 306 is formed primarily by the pressure sleeve 220 and, more specifically, a thickness t of the cylindrical portion 222 and a gap thickness between an outer surface of the cylindrical portion 222 and an inner bore surface of the carriage 206. The radial seals 216 and 230 are externally pressurized on either side of the cylindrical portion 222 of the pressure sleeve 220 and may deform as shown against the inner (left side) retainers 218. Advantageously, motion of the non-rotating seal carrier 228 in the closing direction (to the right) when the mechanical face seal 302 is formed is split between the non-rotating seal carrier 228 and the pressure sleeve 220, which reduces the overall sliding motion to which the radial seals 216 and 230 are exposed to, which reduces wear and also the tendency of the seal rings to roll.

In the operating condition shown in FIG. 5, the pressurized fluid or media is provided internally to the mechanical face seal, i.e., within the media channel 212 (FIG. 2)

internally to the carriage 206 and the non-rotating seal carrier 228. In this operating condition, similar to the external pressurization condition (FIG. 4), opening and closing hydraulic or pneumatic surfaces (depending on the nature of the fluid being a liquid or a gas) act on surfaces of the non-rotating seal carrier 228, the carriage 206, and the pressure sleeve 220.

More specifically, a pressure distribution 300' acts in an opening direction (left as shown in FIG. 4) along the mechanical face seal 302 interface. As shown in FIG. 5, the pressure at a radially inward edge of the distribution 300' is at a maximum and equals the pressure of fluid, P, applied externally. The pressure then decreases along the interface 302 from the maximum value P to an external pressure value, p, which may be atmospheric pressure or another pressure that is lower than P (p<P). The shape of the distribution 300' is again shown as linear, which applies to liquids, but may take on another shape, for example, logarithmic or polynomial, for other types of fluids such as gasses or even liquids having high viscosity.

A net opening hydraulic surface area 304' can be defined as the total surface area of pressure-imbalanced surfaces of all structures present that have a net pressure applied thereon acting to push the non-rotating seal carrier 228 in an opening direction (towards the left in FIG. 5). Similarly, a net closing hydraulic surface area 306' can be defined as the total surface area of pressure-imbalanced surfaces of all structures present that have a net pressure applied thereon acting to push the non-rotating seal carrier 228 in a closing direction (towards the right in FIG. 4').

As can be seen in FIG. 5, the net opening area 304' is larger than the net closing area 306'. Similar to the condition shown in FIG. 4, the total pressure acting on the closing area 306' is constant across its surfaces, so the pressure distribution is constant across the net closing area 306' with a magnitude of P. The pressure acting on the net opening area is according to the distribution 300' which has a profile, for example, triangular or another shape. For example, if the distribution is triangular, the net force applied by the distribution is lower or about ½ of what the force would have been for a constant application of the pressure P. Even though the net closing area 306' is smaller, for example, 75% or another value, of the net opening area 304', the net closing force acts on both the non-rotating seal carrier 228 and also the pressure sleeve 220, which extends and pushes on the shoulder of the non-rotating seal carrier 228, and is overall larger than the net opening force.

In an example, if it is assumed that the closing area is 75% of the opening area, but a pressure distribution (e.g. triangular) is applied to the opening area, the opening area will be 50% of its total had it been uniform across the opening area, which means that overall there is a 25% force advantage in the closing direction. Thus, the net closing force acting on the non-rotating seal carrier 228 urges the non-rotating seal carrier 228 and pressure sleeve 220 in the closing direction, which results in engagement of the non-rotating and rotating seal members 244 and 246 to form the mechanical face seal 302.

In the operating condition shown in FIG. 5, it can be seen that the net closing area 306' is formed primarily by the pressure sleeve 220 and, more specifically, the thickness t of the cylindrical portion 222 exposed to pressure between the seals 216 and 230, and a gap thickness between an inner surface of the cylindrical portion 222 and an outer surface of the non-rotating seal carrier 228 around the seal 230. In this condition, the flange portion or shoulder 224 of the pressure sleeve 220 also pushes the non-rotating seal carrier 228 in the closing direction (to the right of the figure). The radial seals 216 and 230 are internally pressurized on either side of the cylindrical portion 222 of the pressure sleeve 220 and may deform as shown against the outer (right side) retainers 218. Advantageously, motion of the non-rotating seal carrier 228 in the closing direction (to the right) when the mechanical face seal 302 is formed is split between the non-rotating seal carrier 228 and the pressure sleeve 220, which reduces the overall sliding motion to which the radial seals 216 and 230 are exposed to, which reduces wear and also the tendency of the seal rings to roll.

In one exemplary embodiment in accordance with the disclosure, the present disclosure describes a rotary union that includes a non-rotating component forming a bore, a non-rotating seal carrier slidably disposed in the bore, a pressure sleeve slidably disposed in the bore between the non-rotating component and the non-rotating seal carrier, a non-rotating seal member disposed on the non-rotating seal carrier, and a rotating seal carrier having a rotating seal member disposed thereon, wherein the rotating seal member is disposed in opposed relation to the non-rotating seal member such that a sliding mechanical face seal is formed between the non-rotating and rotating seal members when the non-rotating seal carrier slides towards the rotating seal carrier in the presence of fluid pressure.

As described, the rotary union includes a first radial seal disposed in a first channel formed along the bore, the first radial seal forming a sliding seal between the non-rotating component and the pressure sleeve, and a second radial seal disposed in a second channel formed along an outer surface of the non-rotating seal carrier, the second radial seal forming a sliding seal between the non-rotating seal carrier and the pressure sleeve. The rotary union may further comprise seal retainers disposed in the first and second channels adjacent the first and second radial seals.

In one embodiment, the rotary union further includes a housing having a cylindrical bore extending through a body of the housing, the cylindrical bore being substantially straight, wherein the non-rotating component is a carriage disposed within the cylindrical bore of the housing, and a shaft rotatably supported within the cylindrical bore of the housing, wherein the rotating seal carrier is an annular plate rotatably engaged to rotate with the shaft. The rotary union may further include a plurality of mechanical face seal arrangements in stacked relation within a housing of a multi-media rotary union.

In one embodiment, the pressure sleeve includes a cylindrical portion disposed in sliding and sealing relation between the bore and the non-rotating seal carrier, and a shoulder disposed adjacent the non-rotating seal member, wherein the pressure sleeve is configured to slide under a hydraulic or pneumatic force such that the shoulder abuts a portion of the non-rotating seal carrier when the fluid pressure is present internally relative to the non-rotating seal carrier.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A rotary union, comprising:
a non-rotating component forming a bore;
a pressure sleeve slidably disposed in the bore;
a non-rotating seal carrier slidably disposed within a portion of the pressure sleeve, wherein the pressure sleeve is slidably disposed between both the non-rotating component and the non-rotating seal carrier;
a non-rotating seal member disposed on the non-rotating seal carrier; and
a rotating seal carrier having a rotating seal member disposed thereon, wherein the rotating seal member is disposed in opposed relation to the non-rotating seal member such that a sliding mechanical face seal is formed between the non-rotating and rotating seal members when the non-rotating seal carrier slides towards the rotating seal carrier in the presence of fluid pressure.

2. The rotary union of claim 1, further comprising:
a first radial seal disposed in a first channel formed along the bore, the first radial seal forming a sliding seal between the non-rotating component and the pressure sleeve; and
a second radial seal disposed in a second channel formed along an outer surface of the non-rotating seal carrier, the second radial seal forming a sliding seal between the non-rotating seal carrier and the pressure sleeve.

3. The rotary union of claim 2, further comprising seal retainers disposed in the first and second channels adjacent the first and second radial seals.

4. The rotary union of claim 1, further comprising:
a housing having a cylindrical bore extending through a body of the housing, the cylindrical bore being substantially straight, wherein the non-rotating component is a carriage disposed within the cylindrical bore of the housing; and
a shaft rotatably supported within the cylindrical bore of the housing;
wherein the rotating seal carrier is an annular plate rotatably engaged to rotate with the shaft.

5. The rotary union of claim 4, wherein the non-rotating component, the non-rotating seal carrier, the pressure sleeve, the non-rotating seal member, and the rotating seal carrier together define a seal stage, and wherein the housing further includes a plurality of seal stages in stacked relation to define a multi-passage rotary union.

6. The rotary union of claim 1, wherein the pressure sleeve includes a cylindrical portion disposed in sliding and sealing relation between the bore and the non-rotating seal carrier, and a shoulder disposed adjacent the non-rotating seal carrier.

7. The rotary union of claim 6, wherein the pressure sleeve is configured to slide under a hydraulic or pneumatic force such that the shoulder abuts a portion of the non-rotating seal carrier when the fluid pressure is present internally relative to the non-rotating seal carrier.

8. A multi-media rotary union, comprising:
a housing having a cylindrical bore extending through a body of the housing, the cylindrical bore being substantially straight;
a shaft rotatably supported within the cylindrical bore of the housing;
a carriage forming a bore and radial passages, the carriage disposed in sealed relation within the cylindrical bore of the housing;
a non-rotating seal carrier slidably disposed in the bore;
a pressure sleeve slidably disposed in the bore between the carriage and the non-rotating seal carrier;
a non-rotating seal member disposed on the non-rotating seal carrier; and
a rotating seal carrier having a rotating seal member disposed thereon and additional radial passages, the non-rotating seal carrier being engaged to rotate with the shaft;
wherein the rotating seal member is disposed in opposed relation to the non-rotating seal member such that a sliding mechanical face seal is formed between the non-rotating and rotating seal members when the non-rotating seal carrier slides towards the rotating seal carrier in the presence of fluid pressure to provide a sealed fluid passage extending between the radial passages and the additional radial passages.

9. The multi-media rotary union of claim 8, further comprising:
a first radial seal disposed in a first channel formed along the bore, the first radial seal forming a sliding seal between the carriage and the pressure sleeve; and
a second radial seal disposed in a second channel formed along an outer surface of the non-rotating seal carrier, the second radial seal forming a sliding seal between the non-rotating seal carrier and the pressure sleeve.

10. The multi-media rotary union of claim 9, further comprising seal retainers disposed in the first and second channels adjacent the first and second radial seals.

11. The multi-media rotary union of claim 9, wherein the rotating seal carrier is an annular plate rotatably engaged to rotate with the shaft.

12. The multi-media rotary union of claim 8, wherein the pressure sleeve includes a cylindrical portion disposed in sliding and sealing relation between the bore and the carriage, and a shoulder disposed adjacent the non-rotating seal carrier.

13. The multi-media rotary union of claim 12, wherein the pressure sleeve is configured to slide under a hydraulic or pneumatic force such that the shoulder abuts a portion of the non-rotating seal carrier when the fluid pressure is present in the radial passages.

14. The multi-media rotary union of claim 8, further comprising a plurality of carriages and a plurality of non-rotating seal carriers disposed in alternating fashion along the cylindrical bore of the housing, each of the plurality of carriages and plurality of non-rotating seal carriers having respective non-rotating seal members and rotating seal members thereon to define respective sliding mechanical face seals along the housing.

\* \* \* \* \*